United States Patent [19]

LeFort et al.

[11] Patent Number: 4,845,711
[45] Date of Patent: Jul. 4, 1989

[54] MULTIPLEXING AND DEMULTIPLEXING METHOD AND EQUIPMENTS MEASURING TRANSMISSION QUALITY AND LOCATING OPERATION FAULTS ON MULTIPLEXED DIGITAL CHANNELS

[75] Inventors: Gilbert LeFort; Marc Liger; Jean Walraet; Patrick Boutmy, all of Paris, France

[73] Assignee: Societe Anonyme de Telecommunications (S.A.T.), Paris, France

[21] Appl. No.: 3,594

[22] Filed: Jan. 15, 1987

[30] Foreign Application Priority Data

Jan. 17, 1986 [FR] France ................. 86 00634

[51] Int. Cl.$^4$ ................. H04J 3/07
[52] U.S. Cl. ................. 370/102; 375/112; 370/13
[58] Field of Search ................. 370/102, 17, 13; 375/112

[56] References Cited

U.S. PATENT DOCUMENTS

| | | | |
|---|---|---|---|
| 3,873,773 | 3/1975 | Guy, Jr. ................. | 370/102 |
| 3,987,248 | 10/1976 | Platet et al. ................. | 370/102 |
| 4,302,839 | 11/1981 | Mueller ................. | 370/102 |

OTHER PUBLICATIONS

Jean-Francois Portejoie et al., "Equipement de Multiplexage Numerique TNM 2-4 et Equipements de Surveillance Associes", *Cables & Transmission*, No. 2, Apr. 1978, pp. 246-277.

Primary Examiner—Robert L. Griffin
Assistant Examiner—Marianne Haseman
Attorney, Agent, or Firm—Lowe, Price, LeBlanc, Becker & Shur

[57] ABSTRACT

A predetermined characteristic of each of incoming plesiochronous component signals in a time-division multiplexing equipment is derived at each stuffing time for transmission in the form of a stuffing bit in a respective stuffed signal to be multiplexed in a resulting signal. In a demultiplexing equipment receiving the resulting signal, the stuffing bit in a respective demultiplexed stuffed signal is sampled and simultaneously the predetermined characteristic of the plesiochronous signal outgoing from the demultiplexing equipment is derived at each unstuffing time. The sampled stuffing bit and the derived predetermined characteristic are compared in order to measure the transmission quality of a digital channel carrying the component signal through the two equipments. The predetermined characteristic is preferably the parity of the signal between two consecutive stuffing and unstuffing times. The results of the comparisons, in the form of error signals relating to the component signals, contribute to locating faults in the two equipments, signalled by a checking unit included in the demultiplexing equipment.

20 Claims, 4 Drawing Sheets

MULTIPLEXING AND DEMULTIPLEXING METHOD AND EQUIPMENTS MEASURING TRANSMISSION QUALITY AND LOCATING OPERATION FAULTS ON MULTIPLEXED DIGITAL CHANNELS

BACKGROUND OF THE INVENTION

1. Field of the Invention

This invention relates, in a general manner, to a quality checking of digital channels carrying plesiochronous digital signals through a multiplex digital link having, at its input, a multiplexing equipment synchronizing the plesiochronous signals by stuffing and time-division multiplexing them into a resultant signal and, at its output, a demultiplexing equipment performing the reciprocal operations to the above. Quality checking is aimed particularly at monitoring the channels, to generate alarms, and to locate operation faults in circuits included in the equipments.

2. Description of the Prior Art

Cyclic monitoring equipment for checking the operation of a multiplexing or demultiplexing equipment is known. As described in paragraph 3 of the article by PORTEJOIE et al., entitled "EQUIPEMENT DE MULTIPLEXAGE NUMERIQUE TNM 2-4 ET EQUIPEMENTS DE SURVEILLANCE ASSOCIES" (TNM 2-4 DIGITAL MULTIPLEXING EQUIPMENT AND ASSOCIATED MONOTORING EQUIPMENT), published in CABLES & TRANSMISSION, N°. 2, April 1978, pages 246 to 277, a monotoring equipment associated with a multiplexing equipment, or a demultiplexing equipment, cyclically compares incoming plesiochronous signals to be multiplexed into an outgoing resultant signal, or outgoing plesiochronous signals obtained by demultiplexing an incoming resultant signal, with second plesiochronous signals obtained by demultiplexing the outgoing resultant signal, or incoming resultant signal, in an auxiliary demultiplexing equipment. These bit by bit comparisons provide a check to assure that the data relating to a component plesiochronous signal is not degraded during transcoding, synchronizing-stuffing and multiplexing operations, or desynchronizing-unstuffing, demultiplexing, and transcoding operations, to which the component signal is subjected in the equipment.

However, bit by bit comparisons between two similar component signals, one incoming or outgoing, the other regenerated by auxiliary demultiplexing equipment, necessitates the use of complex and costly circuits. Furthermore, auxiliary demultiplexing equipment of this type is necessary at each end of a digital multiplex link.

OBJECTS OF THE INVENTION

The main object of this invention is to measure the quality of digital channels passing through multiplexing and demultiplexing equipments, by performing quality checking only in the demultiplexing equipment to reduce the cost of channel monitoring.

Another object of this invention is to check the transmission quality of digital channels fed though multiplexing and demultiplexing equipments, without altering the organization of the various operations in the equipments, and more particularly, frame configuration in the resultant signal and its rate, so that the multiplexing and demultiplexing equipments are transparent to the data carried by the digital channels.

A further object of this invention is to measure a predetermined characteristic in an incoming plesiochronous signal to be multiplexed in the multiplexing equipment and to include the measured characteristic in the resulting signal derived from the multiplexing equipment, and to measure an analogous characteristic of an plesiochronous signal transmitted from the demultiplexing equipment and corresponding to the incoming plesiochronous signal, thereby comparing said two measured characteristics in the demultiplexing equipment.

SUMMARY OF THE INVENTION

Accordingly, the invention provides a method for measuring the quality of digital channels applying incoming digital plesiochronous signals to a multiplexing equipment, and receiving digital plesiochronous signals transmitted from a demultiplexing equipment connected to the multiplexing equipment, preferrably through any transmission medium.

As is known, in the multiplexing equipment, the incoming plesiochronous signals respectively associated with the channels are synchronized into incoming stuffed digital signals, respectively, by utilizing pulse stuffing techniques, then the incoming stuffed signals are time-division multiplexed into a resulting signal. According to the invention, stuffing bits which are included in each of the stuffed signals but are not significant according to the prior art, have states defined as a function of a characteristic of the respective incoming plesiochronous signal. The multiplexing equipment includes for each of the digital channels: means for deriving the predetermined characteristic of the respective incoming plesiochronous signal when a stuffing of this signal is requested, and means for inserting in the respective stuffed signal a stuffing bit having a state dependent upon a characteristic of the incoming plesiochronous signal between two consecutive stuffing times.

As is known, in the demultiplexing equipment, the resulting signal is demultiplexed into outgoing synchronized stuffed digital signals, then the outgoing stuffed signals are desynchronized into the outgoing plesiochronous signals by utilizing pulse unstuffing techniques. In the demultiplexing equipment, as in the multiplexing equipment, an analogous characteristic of each of the outgoing plesiochronous signals respectively associated with the channels is derived as a function of data bits of the outgoing plesiochronous signal, the data bits being included between two consecutive stuffing bits in the respective outgoing stuffed signal. Further, the demultiplexing equipment comprises means for sampling the stuffing bits in the respective outgoing stuffed signal thereby deducing the characteristic of the incoming plesiochronous signal corresponding to the outgoing stuffed signal.

The deduced characteristic and the derived characteristic relating respectively to the incoming and outgoing plesiochronous signals in the same digital channel are compared thereby producing an error signal that is analyzed to measure the transmission quality of the channel through the multiplexing and demultiplexing equipments.

According to a preferred embodiment, the derived characteristics of the incoming and outgoing plesiochronous signals are signal parities between consecutive stuffing and unstuffing times respectively.

According to other aspects of the invention, each of the digital channels is monitored to generate alarms from error signals produced by respective characteristic comparing means. The alarm is generated when the derived predetermined characteristic of the respective outgoing plesiochronous signal is not the same as the sampled predetermined characteristic of the respective incoming plesiochronous signal during a given period.

The error signals can be used to locate operation faults in plesiochronous signal synchronizing means and stuffed signal multiplexing means included in the multiplexing equipment, and in resulting signal demultiplexing means and stuffed signal desynchronizing means included in the demultiplexing equipment. In this case, the demultiplexing equipment comprises fault locating means including supplementary means for demultiplexing the resultant signal into supplementary synchronous stuffed signals, switching means for selecting one of the supplementary stuffed signals, supplementary means for desynchronizing the selected stuffed signal, supplementary means which is associated with the supplementary desynchronizing means for sampling stuffing bits, deriving characteristics and comparing characteristics thereby producing a supplementary error signal, and monitoring means receiving all the error signals in order to compare the supplementary error signal with one of the error signals corresponding to the same channel as the selected supplementary stuffed signal.

BRIEF DESCRIPTION OF THE DRAWING

Other advantages and features of the invention will be apparent from the following more particular description of several preferred embodiments of the invention as illustrated in the corresponding accompanying drawings in which.

DESCRIPTION OF THE PREFERRED EMBODIMENTS

Figure 1:
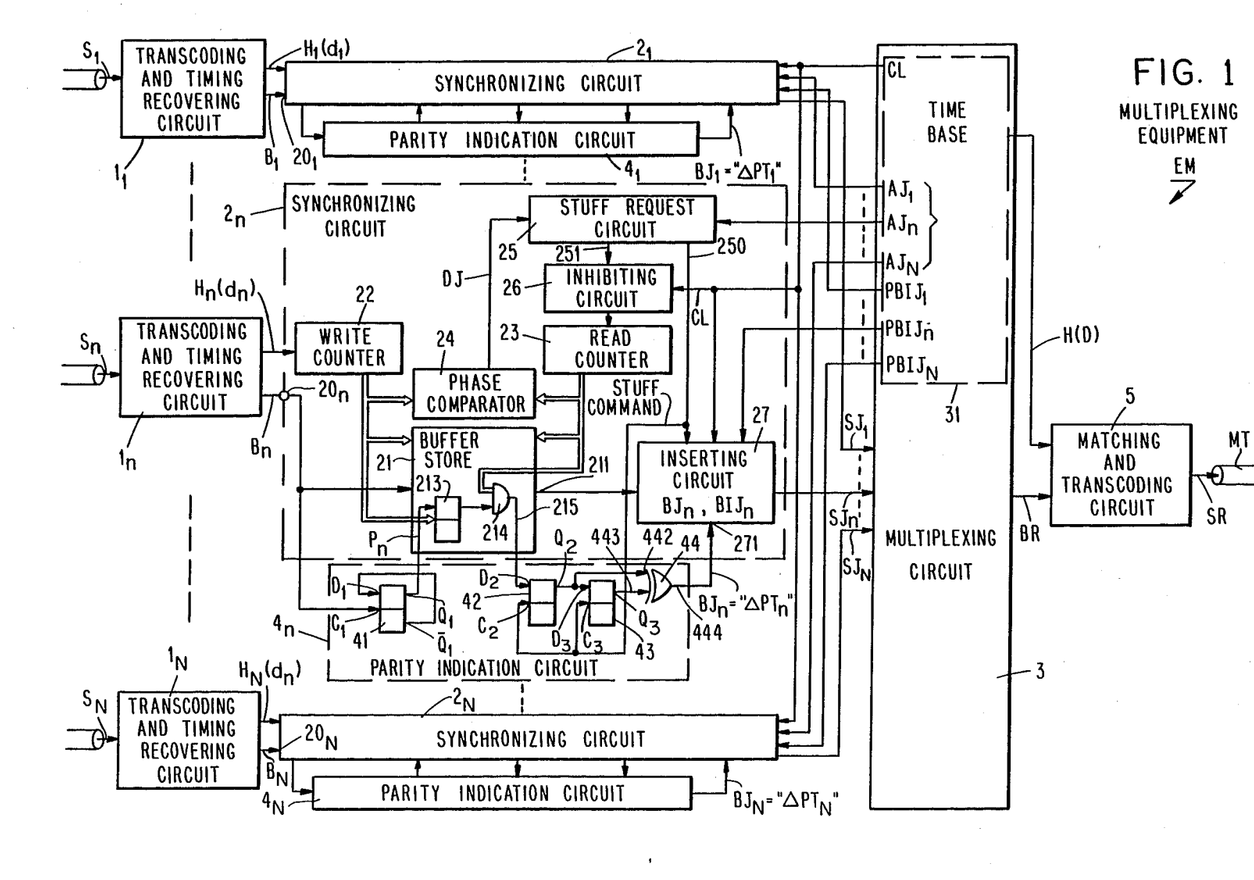
FIG. 1 is a block-diagram of a digital multiplexing equipment embodying the invention, a synchronizing circuit and a parity indication circuit concerning one of incoming plesiochronous signals being shown in detail.

In FIG. 1 is illustrated the structure of a multiplexing equipment EM for multiplexing N incoming digital plesiochronous component signals $S_1$ to $S_N$, having a low nominal rate $d_O$, into a resultant digital signal SR having a high rate $D > Nd_O$.

Component signals $S_1$ to $S_N$ are applied respectively by incoming transmission channels to transcoding and timing recovering circuits $1_1$ to $1_N$, also called junctions. Circuits $1_1$ to $1_N$ convert the digital component signals with a line code into binary signals $B_1$ to $B_N$ and recover clock signals $H_1$ to $H_N$. The line code may be a bipolar code, such as an HDBn high-density code. The clock signals $H_1$ to $H_N$ *have respective frequencies equal to the real rates* $d_1$ to $d_N$ *of the binary signals received*. The real rates vary within specific limits on either side of a nominal rate $d_O$ because of the independence of clocks controlling the establishment of the component signals. Before proceeding with multiplexing in a multiplexing circuit 3, also called a main unit, the plesiochronous signals $B_1$ to $B_N$ are synchronised into stuffed (or justified) component signals $SJ_1$ to $SJ_N$ having the same rate $dj = D/N$ in identical synchronizing circuits $2_1$ to $2_N$, also called channel units. The rate $dj$ is substantially greater than the rate $d_O$ and is such that:

$$dj \cdot 32 (1 + \alpha) d_O$$

where $\alpha$ is a number smaller than 1 and chosen so that the rate $dj$ is always greater than all the real rates of the incoming component signals $d_1$ to $d_N$.

In practice, raising the rate from $d_O$ to $dj$ takes account on the one hand of the systematic insertion of bits of a frame alignment word, service bits and stuffing indication bits (the number of which is predetermined per frame of the resultant signal), and on the other hand of the insertion upon request of positive stuffing bits in order to make up for the difference between a constant rate and each real rate of the component signal. For example, each frame of the resultant signal is shared among various sectors, of a number equal to N for example, having the same number of bits. The first sector comprises, as a header, a frame alignment word and service bits. The following sectors each have as a header N stuffing indication bits respectively associated with the component signals. The last sector also comprises N stuffing indication bits plus N stuffing bits associated with the component signals respectively. The other bits in each of the sectors are data bits of the component signals multiplexed bit by bit. A stuffing indication bit associated with a component signal is intended to indicate in a demultiplexing equipment that a stuffing bit occupying a predetermined location in the frame, (here at the beginning of the last sector.) has been inserted in the corresponding stuffed signal in order to make up for the difference between the real rate of the component signal and the rate $dj$, or has not been inserted into the stuffed signal if the rate of the component signal is equal to rate $dj$, to within the constant ratio of the number of data bits in a frame to the sum of this number and the number of inserted automatically bits. When stuffing of a component signal is requested, all the stuffing indication bits in a frame associated with the component signal are at a predetermined state, typically state "1", unstuffing occurs in the demultiplexing equipment when the number of stuffing indication bits at state "1" in the frame is greater than a predetermined number, for example equal to 2 or 3 < N. Using the prior art, when there is stuffing, the stuffing bit at a predetermined state is equal to the last transmitted data bit of the component signal.

In order to demonstrate the additions and modifications made by this invention, a synchronizing circuit $2_n$, according to a preferred embodiment, is illustrated in detail in FIG. 1 where n is an integer lying between 1 and $N_i$. The synchronizing circuit $2_n$ comprises a buffer store 21, a write counter 22 and a read counter 23 having a modulus equal to the number of cells in the store in turn equal to the number of bits per frame, a phase comparator 24, a stuffing request circuit 25, an inhibiting circuit 26 and a stuffing indication bit and stuffing bit inserting circuit 27.

Buffer store 21 increases the rate $d_n$ of the incoming binary signal $B_n$ received at input $20_n$, to the rate $dj$ of the stuffed signal $SJ_n$ by inserting blanks or dummy bit time slots or holes in the latter ready for filling, on the one hand by stuffing indication bits $BIJ_n$ and stuffing bits $BJ_n$, which are inserted by inserting circuit 27, and on the other by a part, inversely proportional to N, of the bits of the frame alignment word and the service bits, which are inserted by multiplexing circuit 3. In buffer store 21, the store cells are parallel-connected and each memories or store one bit of signal $B_n$, and each conventionally comprises a write flip-flop and a read AND gate.

The bits of incoming signal $B_n$ are written in turn at the timing dof the recovered clock signal $H_n$ in the flip flops of the cells of store 21, under the control of counter 22.

Read counter 23 activates the gates of the cells to read the bits written at the timing of a read control clock signal CL which is generated by a time base 31 included in the multiplexing circuit 3. Time base 31 contains a local clock having a frequency equal to or an integer multiple of the rate D of resultant binary signal BR derived from multiplexing circuit 3 and derives, by frequency division, various control signals to control a parallel-to-serial conversion of the synchronous stuffed signal $SJ_1$ to $SJ_N$ into the resultant signal BR and to insert the frame alignment word and service bits at the beginning of each frame, and other signals used for systematic insertion of bits BIJ and for insertion of bits $BJ_n$ on request. These other last signals are the read control signal CL transmitted to the inhibiting circuits and the inserting circuits in all synchronizing circuits $2_1$ to $2_N$, stuffing authorization signals $AJ_1$ to $AJ_N$ applied respectively to the stuffing request circuits in circuits $2_1$ to $2_N$, and stuffing indication bit locating signals $PBIJ_1$ applied respectively to the inserting circuits in circuits $2_1$ to $2_N$. The read control signal CL is synchronized with the stuffed signals $SJ_1$ and $SJ_N$ and contains the blanks corresponding to the systematic insertion bits.

In synchronizing circuit $2_n$, the phase comparator 24 constantly compares the counts of counters 22 and 23 and detects any discrepancy between them when a CL read clock pulse overlaps an $H_n$ write clock pulse, that is when the count in the read counter is one more than that of the write counter. This discrepancy results in a stuffing request signal DJ being supplied by phase comparator 24 to circuit 25 and memorized in it pending the next stuffing authorization signal $AJ_n$. For this, the signal $AJ_n$ indicates the location of bit $BIJ_n$ in the last sector of the frame and to allow insertion of a stuffing bit, if requested, at the predetermined location in the binary signal with blanks delivered in serial form from output 211 of store 21 and applied to circuit 27. Output 211 is connected to the AND gates of the cells in store 21 through an OR gate. Thus, when a stuffing request DJ is delivered by comparator 24, the stuffing request circuit 25 on the one hand commands, via output 250, the insertion of a stuffing bit $BJ_n$ in inserting circuit 27, and on the other, commands via output 251 inhibition of a clock pulse in the read clock signal CL corresponding to the location of the stuffing bit $BJ_n$ to be inserted so that the read counter 23 connected to circuit 26 is rephased with write counter 22. For each frame, the inserting circuit 27 systematically inserts in the binary signal at output 211 of buffer store 21, the stuffing indication bits $BIJ_n$. Bits $BIJn$ are inserted into the corresponding blanks according to the signal $PBIJ_n$. Upon request, a stuffing bit $BIJ_n$ is inserted in reply to the stuffing command signal at output 250 to form the stuffed signal $SJ_n$.

As already mentioned, using the prior art circuit 27 includes bistable flip-flops and logic gates to insert (a) stuffing indication bits at the predetermined state "2" and (b) stuffing bits, which are respectively copies of the data bits immediately preceding in the component signal $B_n$.

According to the invention, by means of some simple modifications to insertion circuit 27, each stuffing bit $BJ_n$ depends on a predetermined characteristic of the data bits, (such as parity,) of the incoming plesiochronous component signal between said stuffing bit and the stuffing bit inserted and transmitted just before it. The stuffing bits represent parities of the incoming component signal between consecutive stuffing times and are derived by means of a parity indication circuit $4_n$ also detailed in FIG. 1. Of course, each of the synchronizing circuits $2_1$ to $2_N$ is associated with a parity indication circuit $4_1$ to $4_N$ identical to circuit $4_n$.

On the input, circuit $4_n$ comprises a toggle flip-flop 41 acting as a divide-by-two divider to produce a parity signal $P_n$ from the binary component signal $B_n$. The toggle flip-flop 41 includes, as is known, a bistable D-type flip-flop having an clock input C1 connected to terminal $20_n$, an inverse output $\overline{Q1}$ connected to the toggle flip-flop trigger input D1 and a direct output Q1 delivering the parity signal $P_n$. The signal $P_n$ changes state in response to each leading or rising edge of a "1" bit in the signal $B_n$. Thus at two given times, if the states of the signal $P_n$ are identical to the "0" state or the "1" state, the number of "1" bits in the signal $B_n$ between the two times is odd, and if the states of the signal $P_n$ are different, the number of "1" bits in the signal $B_n$ between the two times is even.

Given that the relative phase of the write and read clock signals supplied by counters 22 and 23 is not indicated at all requested stuffing times with sufficient precision to allow direct reading of the parity signal $P_n$ during an elementary interval of one bit, the parity signal must pass through buffer memory or store 21 in order to phase the parity signal with the binary signal with blanks delivered from the output 211 of store 21. According to the invention, buffer store 21 comprises an additional cell having a bistable flip-flop 213 for writing the parity signal derived from flip-flop 41 at the timing of the write signals supplied by counter 22, and having an AND gate 214 for reading the parity signal at the timing of the read signals supplied by counter 23.

Parity circuit $4_n$ also comprises two bistable D-type flip-flops 42 and 43 and an EXCLUSIVE-OR gate 44. Flip-flop 42 has an input D2 connected to output 215 of gate 214 and has a direct output Q2 connected to trigger input D3 of flip-flop 43. Gate 44 has inputs 442 and 443 connected to direct outputs Q2 and Q3 of flip-flops 42 and 43 respectively and has an output 444 connected to input 271 in inserting circuit 27.

Flip-flops 42 and 43 have clock inputs C2 and C3 which receive the stuffing command signal from output 250 of the stuffing request circuit 25 so that, when stuffing is requested and authorized, flip-flop 43 memorizes a state $P1_n$ of parity signal $P_n$ corresponding to a first stuffing bit insertion time and flip-flop 42 memorizes a state $P2_n$ of parity signal $P_n$ corresponding to a second stuffing bit insertion time following the first time. Gate 44 thus compares these two states of the signal parity $P_n$. Output 444 is at state "1" to indicate even parity when the number of bits at state "1" in the signal $B_n$ between the two insertion times is even, and is at state "0" to indicate odd parity when the number of bits at state "1" in the signal $B_n$ between the two insertion times is odd. The stuffing bit $BJ_n$ to be inserted at said second time by inserting circuit 25 is at state $\Delta PT_{n=P1n} \oplus P2_n$ output 444.

As already stated, and in a known manner, the stuffed signals $SJ_1$ to $SJ_n$ according to the invention are multiplexed bit by bit in multiplexing circuit 3 which introduces the frame alignment word and the service bits for each frame period, to constitute the resultant binary signal BR. The signal BR and a clock signal H frequency D are supplied by multiplexing circuit 3 to a line matching and transcoding circuit 5 connected to a transmission medium MT, such as coaxial or optical-fiber line, or radio link, serving a demultiplexing equipment ED. For example, circuit 5 transcodes the BR binary signal into an SR signal in CMI code ("Coded Mark Inversion") having two levels without DC component.

Figure 2:
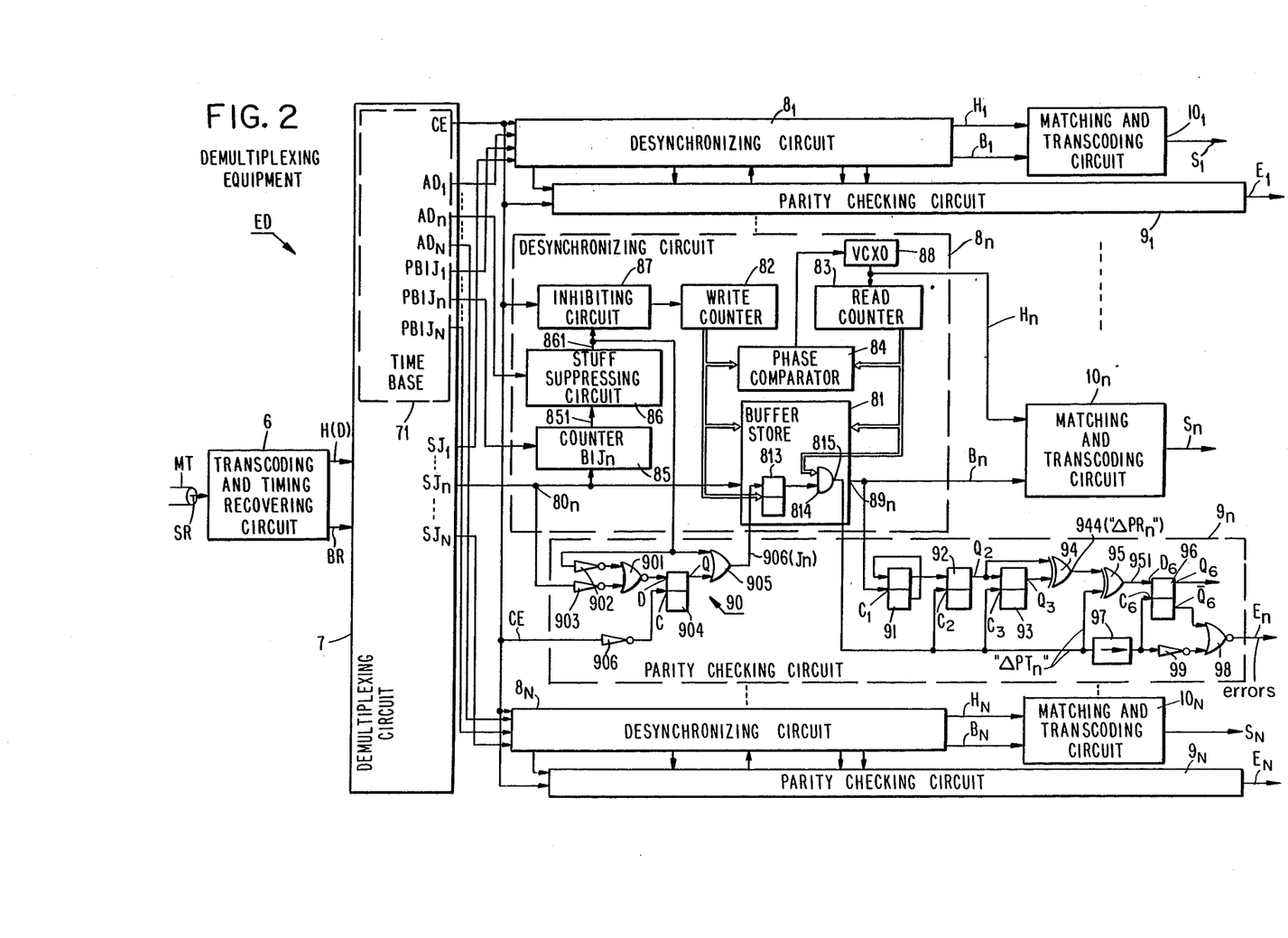
FIG. 2 is a block-diagram of a digital demultiplexing equipment embodying the invention, a desynchronizing circuit and a parity checking circuit concerning one of outgoing plesiochronous signals being shown in detail.

Referring now to FIG. 2, let us first of all recall the structure and operation of the demultiplexing equipment ED for demultiplexing the incoming resultant signal SR into outgoing plesiochronous digital component signals $S_1$ to $S_N$.

At the input, equipment ED comprises a transcoding and timing recovering circuit 6 which converts the received resultant signal SR into a binary signal BR and recovers the clock signal H at frequency D. In a demultiplexing circuit 7, the signal BR is demultiplexed into the component stuffed signals $SJ_1$ to $SJ_N$ under the control of a time base 71 which is phase locked by a frame alignment loss and recovery circuit. One of the functions the time base 71 is to derive a write control signal CE, stuffing indication bit locating signals $PBIJ_1$ to $PBIJ_n$, and unstuffing authorization signals $AD_1$ to $AD_N$ which are similar to signals CL, $PBIJ_1$ to $PBIJ_N$ and $AJ_1$ to $AJ_N$ derived by time base 31 in multiplexing circuit 3, respectively.

Demultiplexing equipment ED also comprises N identical desynchronizing circuits $8_1$ to $8_N$ associated with matching and transcoding circuits $10_1$ to $10_N$ respectively, for unstuffing and desynchronizing the synchronous stuffed signals $SJ_1$ to $SJ_N$ into plesiochronous component signals $S_1$ to $S_N$. FIG. 2 is a detailed circuit diagram of the desynchronizing circuits, $8_n$, for receiving the stuffed signal $SJ_n$ at input $80_n$.

Circuit $8_n$ comprises a buffer store 81, a write counter 82, a read counter 83 and a phase comparator 84 which are respectively similar to circuits 21, 22, 23 and 24 in synchronizing circuit $2_n$ circuit $8_n$ also includes stuffing indication bit counter 85, a stuff suppressing circuit 86, an inhibiting circuit 87, and a VCXO -oscillator 88. In buffer store 81, only the data bits in stuffed signal $SJ_n$ are written at the stuffing timing rate dj under the control of counter 82 and are read at the stuffing timing rate $d_n$ recovered by smoothing of the unstuffed binary signal $B_n$ transmitted by output $89_n$ of buffer store 81 to circuit $10_n$.

In order to write, in particular to suppress the stuffing bits $BJ_n$, counter 85 at each frame period counts the stuffing indication bits in the signal $SJ_n$, signalled by the locating signal $PBIJ_n$. Following a frame alignment word, when counter 85 detects a number of stuffing indication bits $BIJ_n$ at state "1" at least equal to the predetermined number already mentioned, for example 2 or 3<N, an unstuffing request signal is delivered by the counter to circuit 86 via lead 851. In this case, this unstuffing request is memorized in circuit 86 and is processed in response to the next unstuffing authorization signal $AD_n$, thereby deriving an unstuffing command signal applied via a lead 861 to inhibiting circuit 87 which erases the clock pulse corresponding to the stuffing bit in the write control signal CE delivered from time base 71 in demultiplexing circuit 7. The signal CE, minus the clock pulses corresponding to bit $BJ_n$, is applied from circuit 87 to write counter 82 which allows writing only of the data bits of stuffed signal $SJ_n$ in buffer store 81.

Phase comparator 84, local oscillator 88 oscillating at a mean frequency of $d_{n'}$ and read counter 83 form a phase locking loop so that the oscillator, and therefore the store reading frequency can be phased according to the write signal CE. The unstuffed binary signal $B_n$ at output $89_n$ of buffer store 81 is transcoded, for example from $HBDh_n$ code, into the signal $S_n$ by means of the matching and transcoding circuit $10_n$.

According to the invention, each desynchronizing circuit $8_1$ to $8_N$ is associated with a respective parity checking circuit $9_1$ to $9_{N'}$ used to check the quality of the transmission relative to the digital channel carrying component signals $S_1$ to $S_N$, i.e. transmission quality between the input of the respective synchronizing circuit $2_1$ to $2_N$ and the output of the respective desynchronizing circuit $8_1$ to $8_N$.

One of the parity checking circuits, $9_n$, is described hereinafter with reference to FIG. 2 circuit $9_n$ firstly comprises a stuffing bit sampling circuit 90 for phasing the unstuffing command signal and the content of the stuffing bit with signal $B_n$ derived from the buffer store 81. Circuit 90 allows transfer, through an additional cell in buffer store 81, of a signal $J_n$ comprising two pieces of series information, that is the location of the last data bit in the signal $SJ_n$ preceding the stuffing bit to be sampled and the parity $\Delta PT_n$ indicated by the state of the stuffing bit.

Figure 3:
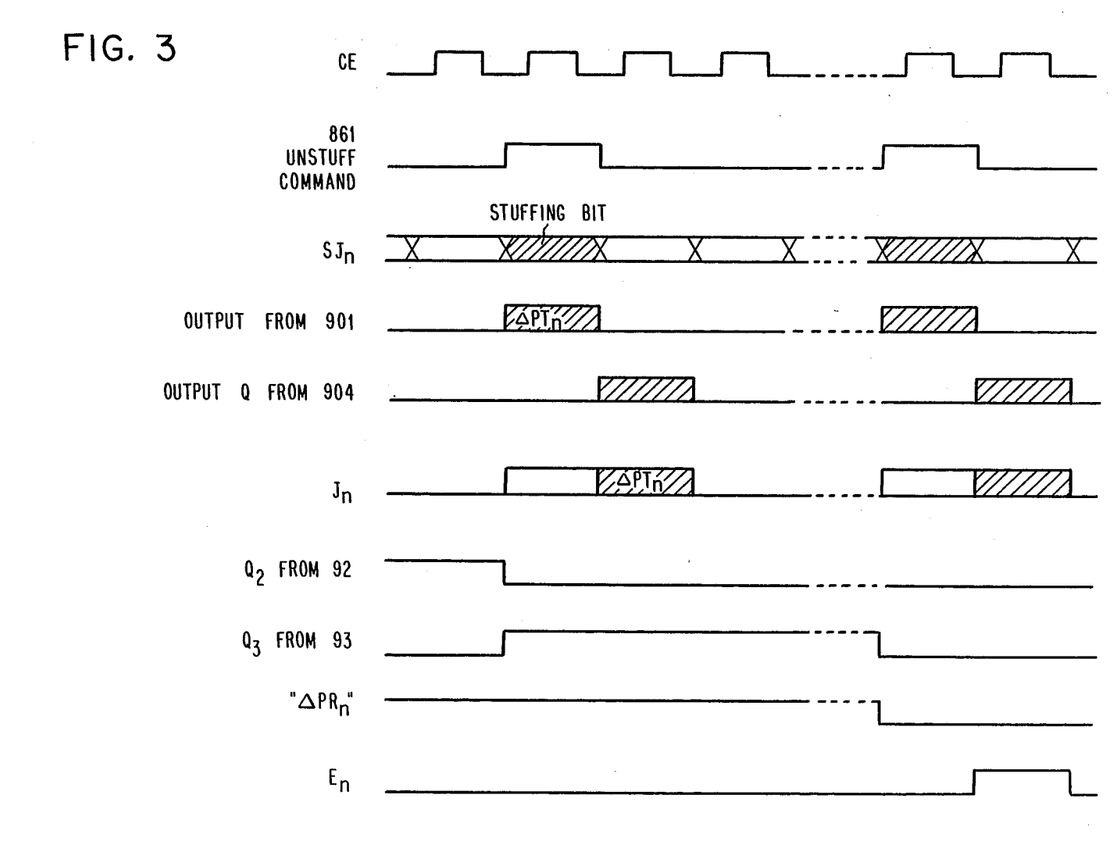
FIG. 3 is a pulse diagram of signals derived in a parity checking circuit.

Circuit 90 comprises a NOR gate 901 having two inputs receiving the unstuffing command signal and the stuffed signal $SJ_n$ through inverters 902 and 903 respectively, a D-type flip-flop 904, and a two-input OR-gate 905. Flip-flop 904 has an input D connected to an output of gate 901, a clock input C receiving the write control signal CE via an inverter 906, and an output Q connected to a first input of gate 905. A second input of gate 905 receives the unstuffing command signal. As shown in the second, third and fourth lines of FIG. 3, the output of NOR gate 901 delivers a stuffing bit sampled from the signal $SJ_n$ in response to the unstuffing command signal. Under the control of the signal CE, flip-flop 904 delays this stuffing bit indicating parity $\Delta PT_n$ by an elementary interval, as shown in a fifth line of FIG. 3, so that the gate pulse of the unstuffing command signal indicating the location of the data bit preceding the sampled stuffing bit is placed in series with the stuffing bit in order to form signal $J_n$ at output 906 of gate 905 as shown in a sixth line of FIG. 3.

In a way similar to the memorization of instantaneous parity in store 21 of synchronizing circuit $2_{n'}$ the signal $J_n$ is transferred to an additional cell of store 81. This additional store cell comprises a write flip-flop 813 and a read AND gate 814. Flip-flop 813 writes signal $J_n$ at the timing of write signals supplied by counter 82, and gate 814 reads the signal $J_n$ at the timing of read signals supplied by counter 83.

At the output of store 81, circuit $9_n$ comprises, as in the parity indication circuit $4_{n'}$ three bistable flip-flops 91, 92 and 93 and an EXCLUSIVE-OR gate 94 interconnected in the same way flip-flops 41, 42, 43 and gate 44, to indicate the parity of the received unstuffed binary signal $B_n$ between two consecutive unstuffing times. For this purpose, clock input C1 of toggle flip-flop 91 is connected to output $89_n$ of buffer store 81, and clock inputs C2 and C3 of flip-flops 92 and 93 receive the signal $J_n$ from output 815 of AND gate 814 in the additional store cell. Thus, in response to the rising or leading edge of signal $J_n$ indicating the location of the stuffing bit sampled from received signal $SJ_{n'}$ outputs Q2 and Q3 of flip-flops 92 and 93 deliver parities of the received signal $B_n$ at two consecutive stuffing times, and output 944 of gate 94 indicates the parity $\Delta PR_n$ of received signal $B_n$ between said sampled stuffing bit and a stuffing bit preceding it, as shown in seventh, eighth and ninth lines of FIG. 3.

Transmission quality checking concerning the component channel passing through circuit $8_n$ involves comparing the parity $\Delta PR_n$ of the outgoing received component signal with the parity $\Delta PT_n$ of the incoming transmitted component signal indicated by the stuffing bit to be suppressed in the received stuffed signal $SJ_{n'}$ sampled and read in phase in the second elementary interval of the gate pulse of signal $J_n$. For this purpose, the parity checking circuit $9_n$ comprises a second EXCLUSIVE-OR gate 95 and a fifth bistable D-type flip-flop 96. Two inputs of gate 95 are respectively connected to output 815 of gate 814 and output 944 of gate 94 so that output 951 of gate 95 indicates the difference or equality between parities $\Delta PR_n$ and $\Delta PT_n$ of the outgoing received signal $B_n$ at output $89_n$ of store 81 and the incoming transmitted signal $B_n$ at input $20_n$ of store 21, both parities being established between the two same significant times corresponding to two consecutive pairs of stuffing and unstuffing. The parity difference is memorized in flip-flop 96 having input D6 connected to output 951 and clock input C6 receiving the signal $J_n$ via a delay circuit 97. Direct output Q6 of flip-flop 96 has a "1" state in response to the parity between the transmitted and received binary signals $B_n$ differing to indicate a transmission fault between input $20_n$ of synchronizing circuit $2_n$ and output $89_n$ of desynchronizing circuit $8_n$. The fault is preferably signalled by an error pulse signal at output $E_n$ of a NOR gate. Gate 98 has one input connected to inverse output $\overline{Q6}$ of flip-flop 96 and another input connected to the output of delay circuit 97 via an inverter 99. The error signal $E_n$ is then processed in a quality checking unit DCL for recording and alarm signalling, and preferably for fault locating as seen subsequently. Unit DCL generates a visual and/or audible alarm for example when a predetermined number of error pulses is reached over a given period of time.

Thus, according to the invention, the stuffing bits provide permanent information as to the quality of the transmission on the component channels between inputs $20_1$ to $20_N$ of the synchronizing circuits and outputs $89_1$ to $89_N$ of the desynchronizing circuits, and thus allow detection of operation faults in the circuits, in particular in the buffer stores at write or read level, in multiplexing and demultiplexing circuits 3 and 7, such as a clock failure at rate D or frame synchronization faults, and in transcoding circuits 5 and 6, such as encoding violations or discrepancies or failures to restore timing.

Figure 4:
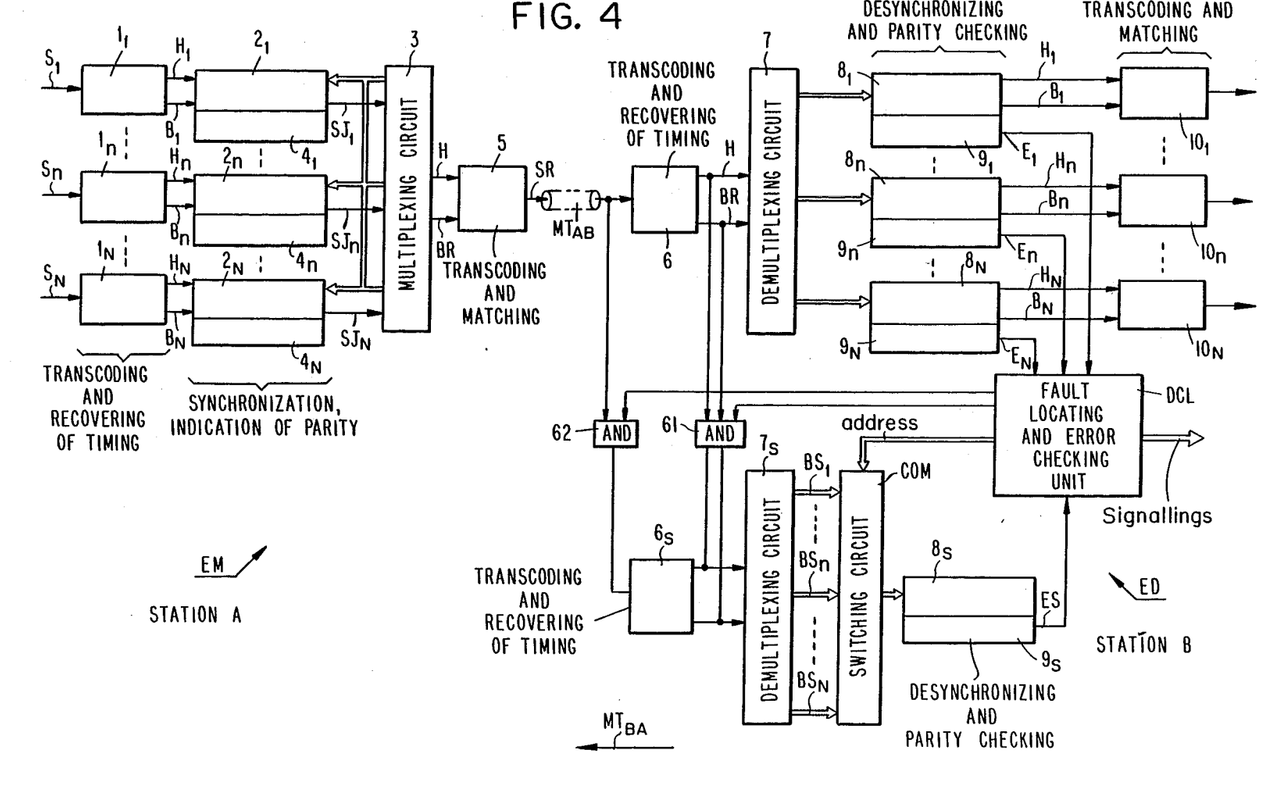
FIG. 4 is a schematic diagram of a digital transmission link between multiplexing and demultiplexing equipments embodying the invention, endowed with a means included in the demultiplexing equipment for locating operation faults.

As an example, FIG. 4 is block diagram of a transmission quality monitoring system designed for carrying out the principles of the method embodying the invention described above. This system monitors a bidirectional link between two stations A and B, each equipped with multiplexing and demultiplexing equipments embodying the invention, and locates transmission faults in the stations. In FIG. 4, only the monodirectional link from station A to station B is illustrated in detail. Thus, station A receives N incoming plesiochronous component signals $S_1$ to $S_N$ which are stuffed and multiplexed into a resultant signal SR transmitted via a transmission medium $MT_{AB}$ to station B, in which the SR signal is demultiplexed into N outgoing plesiochronous component signals which are normally identical to incoming signals $S_1$ to $S_N$; conversely, station B receives N other incoming plesiochronous component signals which are stuffed and multiplexed into a resultant signal transmitted via a transmission medium $MT_{BA}$ to station A where the resultant signal is demultiplexed into N outgoing plesiochronous component signals which are normally identical to the signals incoming into station B.

With reference to the A to B link, station B is equipped with a fault locating and error checking unit DCL connected to error outputs $E_1$ to $E_N$ of the parity checking circuits $9_1$ to $9_N$, a supplementary demultiplexing circuit 7S identical to circuit 7, a switching circuit COM, and a supplementary desynchronizing circuit 8S associated with a supplementary parity checking circuit 9S. The demultiplexing circuit 7S is connected in parallel to the two outputs of the transcoding and timing recovering circuit 6 via an AND circuit 61 which opens under the control of the locating and checking unit DCL when fault location is requested automatically or manually by an operator. One of N 4-wire output buses $BS_1$ to $BS_N$ of the demultiplexing circuit 7S is selected in the switching circuit COM under the control of the unit DCL, in order to transmit the corresponding assembly of the component stuffed signal, the write control signal CE, the unstuffing authorization signal and the stuffing indication bit locating signal to respective inputs of the supplementary desynchronizing circuit 8S. Error output Es of the parity checking circuit 9S then allows error pulses to be delivered to the quality checking unit DCL for comparison with error pulses coming from output $E_1$ to $E_N$ of one of selected circuits $9_1$ to $9_N$ corresponding to rank 1 to N of bus $BS_1$ to $BS_N$.

When error pulses are detected at output $E_n$ of one of the parity checking circuits $9_n$ in station B, the unit DCL checks that the majority of outputs $E_1$ to $E_N$, preferably in number substantially lower than N, is not transmitting error pulses. This means that all common circuits 3, 5, 6 and 7 through which the component signals pass are not faulty, and that a fault exists in respective circuits $2_n$ and $8_n$. Automatically, or on request, the unit DCL connects demultiplexing circuit 7S to circuit 6 by opening enabling AND circuit 61 to select bus $BS_n$. Circuit 9S checks the quality of transmission relating to signal $S_n$ which, in the unit DCL, is compared with that checked by circuit $9_n$. If error pulses are transmitted by outputs ES and $E_{n'}$ the unit DCL signals an operation fault in synchronizing circuit $2_n$; on the other hand, if no error pulse is transmitted by the output ES and error pulses nonetheless remain at output $E_n$, the unit DCL signals an operation fault in desynchronizing circuit $8_n$.

According to a second hypothesis, error pulses are detected at the majority of outputs $E_1$ to $E_N$, preferably in number substantially lower than N, by the fault locating and error checking unit DCL. This means that multiplexing circuit 3 or demultiplexing circuit 7 is faulty. To determine which of the two circuits 3 and 7 is faulty, the unit DCL connects circuits 6 and 7S by enabling AND circuit 61 and carries out a selection cycle on all output buses BS$_1$ to BS$_N$ corresponding to error pulse outputs E$_1$ to E$_N$, by addressing them successively and cyclically in the switching circuit COM. If the output ES of the supplementary checking circuit 9S delivers error pulses in response to the majority of the buses BS$_1$ to BS$_N$ being addressed, therefore corresponding to outputs E$_1$ to E$_N$ delivering error pulses, the unit DCL signals an operation fault in the multiplexing circuit 3; on the other hand, if output ES only delivers a small number of error pulses in response to all the buses being addressed, the unit DCL signals an operation fault in demultiplexing circuit 7.

In the two described locating procedures, it has been assumed that circuit 5 at the output of station A and circuit 6 at the input of station B were operating correctly. However, in an other embodiment, station B is equipped with a supplementary transcoding and timing recovering circuit 6S connected to the transmission medium MT$_{AB}$ via an analog AND gate 62 controlled by the unit DCL. Circuit 6S has resultant binary signal and clock outputs connected to multiplexing circuit 7S. Thus for the alternative resulting from the second locating hypothesis above, in which the unit DCL received a high number of error pulses through output ES, this in fact means that one of circuits 3, 5 and 6 is faulty. In this case, the unit DCL disables AND circuit 61 and opens gate 62 and cyclically addresses buses BS$_1$ to BS$_N$ in the switching circuit COM. Unit DCL, in response to receiving a high number of error pulses through the output ES during the previous addressing cycle, signals a fault in circuits 3 and 5 which would could be located by analyzing the test results signalled by other known test and checking devices included in station B, for example encoding-decoding violation detecting devices; if, on the other hand, the number of error pulses is low, the unit DCL signals a failure in circuit 6.

It should be noted that supplementary devices 61, 7S, COM, 8S, 9S, 62 and 6S are only started for fault locating. The fault locating procedure is completely separate from simultaneous permanent quality checking of all digital channels S$_1$ to S$_N$, and is therefore unlike traditional cyclic monitoring equipment, as described in the PORTEJOIE et al. article mentioned earlier. Furthermore, these same supplementary devices can be used to monitor other digital links similar to those which were described as arriving at station B.

In addition, the demultiplexing circuit 7S can be connected selectively to the output of a multiplexing circuit in station B, equivalent to circuit 3, i.e., and allocated to the other direction of transmission, B to A, via an AND circuit similar to circuit 61; the transcoding and timing recovering circuit 6S can be connected selectively to the input of the transmission medium MT$_{BA}$ via an AND circular similar to circuit 62.

What we claim is:

1. A method of measuring the quality of digital channels between a multiplexing equipment and a demultiplexing equipment, said channels respectively applying digital plesiochronous signals fed to said multiplexing equipment for synchronization by utilizing techniques for pulse stuffing into digital stuffed signals which are multiplexed into a digital resultant signal, said resultant signal being supplied to said demultiplexing equipment for demultiplexing into digital stuffed signals which are desychronized by utilizing techniques for pulse unstuffing into outgoing plesiochronous digital signals, said method comprising for each of said digital channels, in said multiplexing equipment, deriving a predetermined characteristic of the respective incoming plesiochronous signal during signal stuffing times for transmission in the form of stuffing bits in the respective stuffed signal, said predetermined characteristic of the incoming plesiochronous signal being a function of the bits in said incoming plesiochronous signal between two consecutive stuffing times, in said demultiplexing equipment, sampling each of said stuffing bits in the respective stuffed signal while deriving a predetermined characteristic of the respective outgoing plesiochronous signal during an unstuffing time, said predetermined characteristic of the outgoing plesiochronous signal being a function of the bits in said outgoing plesiochronous signal between two consecutive unstuffing times, and comparing said sampled stuffing bit and the derived predetermined characteristic of the outgoing plesiochronous signal to provide a measure of the quality of the respective channel.

2. A method of measuring the quality of digital channels between a multiplexing equipment and a demultiplexing equipment, said channels respectively applying digital plesiochronous signals fed to said multiplexing equipment for synchronization by utilizing techniques for pulse stuffing into digital stuffed signals which are multiplexed into a digital resultant signal, said resultant signal being supplied to said demultiplexing equipment for demultiplexing into digital stuffed signals which are desynchronized by utilizing techniques for pulse unstuffing into outgoing plesiochronous digital signals, said method comprising for each of said digital channels, in said multiplexing equipment, deriving a predetermined characteristic of the respective incoming plesiochronous signal during signal stuffing times for transmission in the form of stuffing bits in the respective stuffed signal, and in said demultiplexing equipment, sampling each of said stuffing bits in the respective stuffed signal while deriving predetermined characteristic of the respective outgoing plesiochronous signal during an unstuffing time, and comparing said sampled stuffing bit and the derived predetermined characteristic of the outgoing plesiochronous signal to provide a measure of the quality of the respective channel, said predetermined characteristic being the parity of the incoming and outgoing plesiochronous signals between two consecutive stuffing and unstuffing times.

3. A multiplexing equipment comprising:

a plurality of pulse stuffing means for synchronizing incoming digital plesiochronous signals into corresponding synchronized stuffed digital signals and for deriving a stuffing command signal, means for multiplexing said stuffed signals into a digital resultant signal, and associated with each of said synchronizing means:

means for deriving a predetermined characteristic of said respective incoming plesiochronous signal in response to a stuffing command signal deriving by said synchronizing means, and means for inserting a stuffing bit dependent on said characteristic into said respective synchronized signal, said deriving means comprising means for deriving a parity signal from said respective incoming plesiochronous signal, means controlled by said stuffing command signal for storing two states of said parity signal at first and second sequential stuffing times, and means for comparing said two parity signal states simultaneously at said second time to derive a stuffing bit having a state indicating the parity of said respective incoming plesiochronous signal between said first and second times.

4. The multiplexing equipment of claim 3 wherein one of synchronizing means includes a buffer store for receiving the incoming plesiochronous signal associated with said one synchronizing means, said buffer store comprising a cell for transferring said parity signal from said parity signal deriving means to said storing means thereby to phase said parity signal with said synchronized signal deriving from said one synchronizing means.

5. A demultiplexing equipment comprising:
  means for demultiplexing a resultant digital signal into synchronous digital stuffed signals,
  a plurality of pulse unstuffing means for desynchronizing said synchronous stuffed signals into respective outgoing plesiochronous digital signals and for deriving an unstuffing command signal,
  associated with each of said desynchronizing means:
  means for sampling a stuffing bit in said respective stuffed signal to be desynchronized in response to the unstuffing command signal derived by said desynchronizing means, means responsive to said unstuffing command signal for deriving a predetermined characteristic of said respective outgoing plesiochronous signal simultaneously with sampling of said stuffing bit, and first means for comparing said predetermined characteristic of said respective outgoing plesiochronous signal with said sampled stuffing bit, thereby measuring the quality of said outgoing plesiochronous signal, said sampling means including means for sampling the state of said stuffing bit in said respective stuffed signal at another unstuffing time in response to said unstuffing command signal, said deriving means comprising means for deriving a parity signal from said respective outgoing plesiochronous signal, means controlled by said unstuffing command signal for storing two parity signal states at a first unstuffing time preceding said second time and at said second time, and second means for comparing said two parity signal states after said second time to detect the parity of said respective outgoing plesiochronous signal between said first and second times, and said first comparing means comparing said outgoing plesiochronous signal parity with said sampled stuffing bit representing an old parity of said plesiochronous signal.

6. The demultiplexing equipment of claim 5, wherein said sampling means comprises means for extracting the contents of a stuffing bit from said respective stuffed signal to be desynchronized, means for delaying said extracted content of said stuffing bit, and means for deriving a gate pulse signal for indicating a location of said stuffing bit in said respective stuffed signal and said stuffing bit content, and said respective desynchronizing means including a buffer store for receiving said respective stuffed signal, said buffer store comprising a cell for transferring said location gate pulse and content signal to said memorizing means and first comparing means so that said stuffing bit location gate pulse controls memorization of two states of said parity signal in phase with said respective outgoing plesiochronous signal.

7. A time-division multiplexing and demultiplexing system comprising:
  means for synchronizing incoming digital plesiochronous signals into incoming synchronized respective stuffed digital signals, each of said incoming stuffed signals including stuffing bits, a stuffing bit in a stuffed signal having a state dependent on a function of a predetermined parity characteristic of the respective incoming plesiochronous signal between said stuffing bit and another stuffing bit of said stuffed signal preceding said stuffing bit,
  means for multiplexing said incoming synchronized stuffed signals into a digital resulting signals,
  means for demultiplexing said resulting signal into outgoing synchronized stuffed digital signals which are normally identical to said incoming synchronized stuffed signals respectively,
  means for desynchronizing said outgoing synchronized stuffed signals into outgoing digital plesiochronous signals which are normally identical to said incoming plesiochronous signals respectively, an outgoing stuffed signal being desynchronized for sampling stuffing bits, said means for desynchronizing including means for deriving a predetermined characteristic of an outgoing plesiochronous signal between two consecutive sampled stuffing bits in the respective outgoing stuffed signal, and
  means respectively connected to said desynchronizing means for comparing said characteristics of said incoming plesiochronous signals in the form of said sampled stuffed bits with said derived characteristics of said outgoing plesiochronous signals respectively, to thereby provide a measure of the transmission quality of said system.

8. A time-division multiplexing and demultiplexing system interconnected to a plurality of digital channels, said system comprising:
  a plurality of pulse stuffing means for receiving incoming digital plesiochronous signals transmitted from digital channels for synchronizing said incoming plesiochronous signals into incoming synchronized stuffed digital signals respectively, said pulse stuffing means including means for deriving a stuffing command signal and means for stuffing bits at predetermined locations in said incoming stuffed signal in response to the respective stuffing command signal derived by the respective synchronizing means,
  a plurality of means for receiving said incoming plesiochronous signals for deriving predetermined characteristics of said respective incoming plesiochronous signals,
  means responsive to the stuffing command signal for indicating the characteristic of an incoming plesiochronous signal as determined by the state of a stuffing bit to be inserted in the respective incoming stuffed signal,
  means for multiplexing said incoming stuffed signals into a digital resultant signal, means for demultiplexing said resultant digital signal into outgoing synchronized stuffed digital signals normally identical to said incoming stuffed digital signals respectively, plural pulse unstuffing means for desynchronizing said outgoing stuffed signals into outgoing digital plesiochronous signals to be transmitted into said digital channels respectively, said outgoing plesiochronous signals being normally identical to said incoming plesiochronous signals respectively, each of said desynchronizing means producing a respective unstuffing command signal in correspondence with stuffing bits included in the respective outgoing stuffed signal, a plurality of means receiving said outgoing stuffed signals for sampling said stuffing bits in said outgoing stuffed signals to thereby deduce said characteristics of said incoming plesiochronous signals respectively, a plurality of means receiving said outgoing plesiochronous signals and associated with said digital channels for deriving predetermined characteristics of said outgoing plesiochronous signals simultaneously with samplings of stuffing bits respectively, and a plurality of means respectively connected to said sampling means and said outgoing plesiochronous signal characteristic deriving means for comparing the sampled stuffing bits with the outgoing plesiochronous signal characteristics respectively thereby to provide a measure of the transmission quality of said digital channels through said system, said predetermined characteristic of each of said incoming and outgoing plesiochronous signals being the parity of said signal.

9. A time-division multiplexing and demultiplexing system interconnected to a plurality of digital channels, said system comprising:

a plurality of pulse stuffing means for receiving incoming digital plesiochronous signals transmitted from digital channels for synchronizing said incoming plesiochronous signals into incoming synchronized stuffed digital signals respectively, said pulse stuffing means including means for deriving a stuffing command signal and means for stuffing bits at predetermined locations in said incoming stuffed signal in response to the respective stuffing command signal derived by the respective synchronizing means, a plurality of means for receiving said incoming plesiochronous signals for deriving predetermined characteristics of said respective incoming plesiochronous signals, means responsive to the stuffing command signal for indicating the characteristic of an incoming plesiochronous signal as determined by the state of a stuffing bit to be inserted in the respective incoming stuffed signal, means for multiplexing said incoming stuffed signals into a digital resultant signal, means for demultiplexing said resultant digital signal into outgoing synchronized stuffed digital signals normally identical to said incoming stuffed digital signals respectively, plural pulse unstuffing means for desynchronizing said outgoing stuffed signals into outgoing digital plesiochronous signals to be transmitted into said digital channels respectively, said outgoing plesiochronous signals being normally identical to said incoming plesiochronous signals respectively, each of said desynchronizing means producing a respective unstuffing command signal in correspondence with stuffing bits included in the respective outgoing stuffed signal, a plurality of means receiving said outgoing stuffed signals for sampling said stuffing bits in said outgoing stuffed signals to thereby deduce said characteristics of said incoming plesiochronous signals respectively, a plurality of means receiving said outgoing plesiochronous signals and associated with said digital channels for deriving predetermined characteristics of said outgoing plesiochronous signals simultaneously with samplings of stuffing bits respectively, a plurality of means respectively connected to said sampling means and said outgoing plesiochronous signal characteristic deriving means for comparing the sampled stuffing bits with the outgoing plesiochronous signal characteristics respectively, thereby to provide a measure of the transmission quality of said digital channels through said system, each of said comparing means associated with a digital channel including means for deriving an error signal in response to the derived characteristic of the respective outgoing plesiochronous signal differing from the derived characteristic of the respective incoming plesiochronous signal represented by a stuffing bit sampled in the respectively outgoing stuffed signal, means for receiving the error signal derived by said comparing means for locating operation faults in said synchronizing means, said multiplexing means, said demultiplexing means and said desynchronizing means, said locating means comprising:

supplementary means for demultiplexing said resultant digital signal into supplementary synchronized stuffed digital signals normally identical to said incoming stuffed digital signals respectively, switching means for selecting one of said supplementary stuffed signals, supplementary means analogous to one of said desynchronization means for desynchronizing said selected supplementary stuffed signal into a supplementary digital plesiochronous signal, supplementary means analogous to one of said sampling means for sampling stuffing bits in said selected supplementary stuffed signal, supplementary means analogous to one of said characteristic deriving means for deriving the predetermined characteristic of said supplementary plesiochronous signal simultaneously with samplings of said stuffing bits of said selected supplementary stuffed signal, supplementary means analogous to one of said comparing means for comparing the sampled stuffed bits of said selected supplementary stuffed signal with the supplementary plesiochronous signal characteristic to thereby derive a supplementary error signal, and checking means responsive to all said error signals and said supplementary error signal for comparing said supplementary error signal with the error signal derived by one of said comparing means associated with the desynchronizing means receiving the outgoing stuffed signal normally identical to the selected supplementary stuffed signal, thereby mainly checking the operation of the synchronizing means and desynchronizing means corresponding to the selected supplementary stuffed signal.

10. The time-division multiplexing and demultiplexing system of claim 9, further including means for applying said resultant signal to said supplementary demultiplexing means in response to at least one of said error signals derived by said plural comparing means.

11. The time-division multiplexing and demultiplexing system of claim 9 wherein said checking means includes means for controlling said switching means whereby the selected supplementary stuffed signal corresponds to one of said stuffed signals to be desynchronized by said plurality of said desynchronized means for which an error signal is being received by said checking means.

12. The time-division multiplexing and demultiplexing system of claim 9 wherein said checking means includes means for controlling cyclic selection of several supplementary stuffed signals in said switching means in response to several error signals respectively derived by several of said comparing means, said several comparing means being associated with several desynchronizing means receiving outgoing stuffed signals normally identical to said several selected supplementary stuffed signals, thereby primarily locating an operation fault in said multiplexing means and demultiplexing means.

13. Apparatus for demultiplexing a resultant digital signal comprising
   means for demultiplexing the resultant digital signal into N synchronous digital stuffed signals, where N is an integer greater than one,
   N pulse unstuffing means for deriving an unstuffing command signal and for desynchronizing said N synchronous stuffed signals into N outgoing plesiochronous digital signals, so that a kth unstuffing means derives a kth one of the synchronous stuffed signal that is desynchronized into a kth one of the outgoing plesiochronous digital signals, where $1 \leq k \leq N$,
   the kth one of said N pulse unstuffing means including:
   means responsive to the unstuffing command signal for sampling a stuffing bit in the kth stuffed signal to be desynchronized, means responsive to said unstuffing command signal and the kth outgoing plesiochronous signal for deriving an indication of a predetermined characteristic of the kth outgoing plesiochronous signal simultaneously with sampling of said stuffing bit, and means responsive to said indication and the kth sampled stuffing bit for comparing said predetermined characteristic of the kth outgoing plesiochronous signal with the kth sampled stuffing bit to provide a measure of the quality of the outgoing plesiochronous signal.

14. The demultiplexing equipment claimed in claim 13,, wherein said first comparing means derives an error signal in response to said derived predetermined characteristic of said kth outgoing plesiochronous signal differing from said sampled stuffing bit.

15. The apparatus of claim 13 wherein the indicated characteristic of the kth outgoing plesiochronous signal indicates bit errors in the kth outgoing plesiochronous signal.

16. A time-division multiplexing and demultiplexing system comprising:
   means for synchronizing N incoming digital plesiochronous signals into N incoming synchronized stuffed digital signals, incoming stuffed signal k including stuffing bits, where N is greater than one and $1 \leq k \leq N$, a stuffing bit in stuffed signal k having a state dependent on a function of a predetermined characteristic of incoming plesiochronous signal k between said stuffing bit and another stuffing bit of said stuffed signal preceding said stuffing bit,
   means for multiplexing said N incoming sychronzed stuffed signals into a resulting digital signal,
   means for demultiplexing said resulting digital signal into N outgoing synchronized stuffed digital signals so the kth outgoing synchronized stuffed digital signal is normally identical to said kth incoming synchronized stuffed signals,
   means for desynchronizing said N outgoing synchronized stuffed signals into N outgoing digital plesiochronous signals so the kth outgoing digital plesiochronous signal is normally identical to the kth incoming plesiochronous signal, an outgoing stuffed signal being desynchronized for sampling stuffing bits,
   said means for desynchronizing including:
   means responsive to the kth outgoing plesiochronous signal for deriving predetermined characteristic of outgoing plesiochronous signal k between two consecutive sampled stuffing bits in the kth outgoing stuffed signal, and
   means connected to said desynchronizing means for comparing said characteristics of said kth incoming plesiochronous signal in the form of said sampled stuffed bits with said derived characteristics of said kth outgoing plesiochronous signal, to thereby provide a measure of the transmission quality of said system.

17. The system of claim 16 wherein the predetermined characteristic indicates bit errors in incoming plesiochronous signal k and in outgoing plesiochronous signal k.

18. A time-division multiplexing and demultiplexing system interconnected to N digital channels, where N is an integer greater than one, said system comprising:
   N pulse stuffing means for receiving N incoming digital plesiochronous signals transmitted from N digital channels and for synchronizing said N incoming plesiochronous signals into N incoming synchronized stuffed digital signals so incoming plesiochronous signal k is synchronized into synchronized stuffed digital signal k, each of said pulse stuffing means including means for deriving a stuffing command signal and means for stuffing bits at predetermined locations in the kth incoming stuffed signal in response to the stuffing command signal derived by the kth synchronizing means, where $1 \leq k \leq N$,
   N means responsive to said N incoming plesiochronous signals for deriving predetermined characteristics of said incoming plesiochronous signals so that an indication of the predetermined characteristic of the kth incoming plesiochronous signal is derived,
   means responsive to the stuffing command signal and the indication of the predetermined characteristic for indicating the characteristic of an incoming plesiochronous signal as determined by the state of a stuffing bit to be inserted in the respective incoming stuffed signal, means for multiplexing said incoming stuffed signals into a digital resultant signal, means for demultiplexing said resultant digital signal into N outgoing synchronized stuffed digital signals normally identical to said incoming stuffed digital signals so the kth outgoing synchronized stuffed digital signal is normally identical to the kth incoming stuffed digital signal, N pulse unstuffing means for desynchronizing said N outgoing stuffed signals into N outgoing digital plesiochronous signals to be transmitted to said N digital channels, so the kth outgoing stuffed signal is desynchronized into the kth outgoing digital plesiochronous signal to be transmitted to the kth digital channel, said N outgoing plesiochronous signals being normally identical to said N incoming plesiochronous signals so the kth outgoing plesiochronous signal is normally identical to the kth incoming plesiochronous signal, the kth desynchronizing means producing a kth unstuffing command signal in correspondence with stuffing bits included in the kth outgoing stuffed signal, N means responsive to said N outgoing stuffed signals for sampling said stuffing bits in said N outgoing stuffed signals to thereby deduce said characteristics of said incoming plesiochronous signals so sampling of the stuffing bits of the kth outgoing stuffed signal results in said characteristic of the kth incoming plesiochronous signal being deduced N, means responsive to said outgoing plesiochronous signals and associated with said N digital channels for deriving predetermined characteristics of said N outgoing plesiochronous signals so that the predetermined characteristic of the kth outgoing plesiochronous signal is derived simultaneously with sampling of the kth stuffing bit, and N means respectively connected to said sampling means and said N outgoing plesiochronous signal characteristic deriving means for comparing the kth sampled stuffing bit with the predetermined characteristic of the kth outgoing plesiochronous signal thereby to provide a measure of the transmission quality of said digital channels through said system.

19. The time-division multiplexing and demultiplexing system of claim 37 wherein each of said comparing means associated with a digital channel includes means for deriving an error signal in response to the derived characteristic of the respective outgoing plesiochronous signal differing from the derived characteristic of the respective incoming plesiochronous signal represented by a stuffing bit sampled in the respective outgoing stuffed signal and means for receiving the error signals derived by said comparing means for locating operation faults in said synchronizing means, said multiplexing means, said demultiplexing means and said desynchronizing means.

20. The system of claim 18 wherein the predetermined characteristic indicates bit errors in incoming plesiochronous signal k and in outgoing plesiochronous signal k.

* * * * *